May 31, 1932.   V. OLIVER   1,861,412
METHOD OF AND APPARATUS FOR CLEANING BAND SAWS
Filed Sept. 30, 1931    2 Sheets-Sheet 1
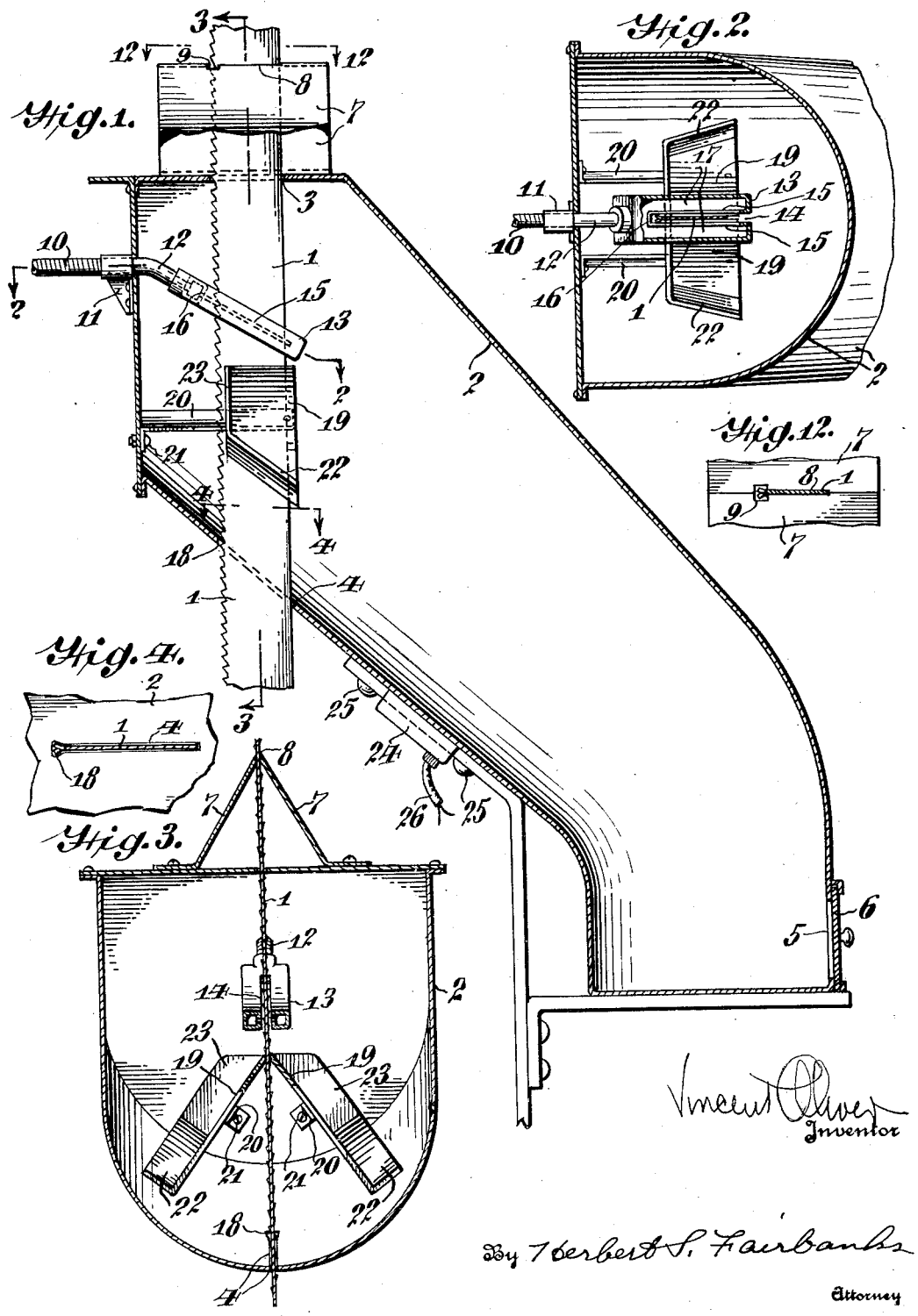

May 31, 1932.  V. OLIVER  1,861,412
METHOD OF AND APPARATUS FOR CLEANING BAND SAWS
Filed Sept. 30, 1931   2 Sheets-Sheet 2
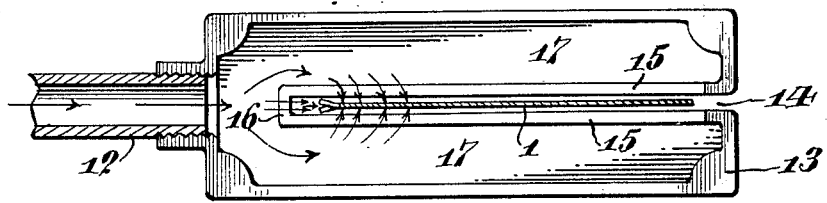
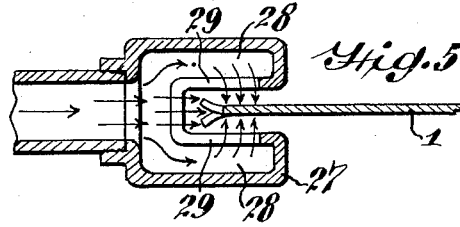
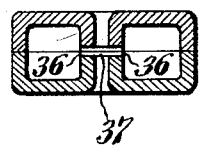
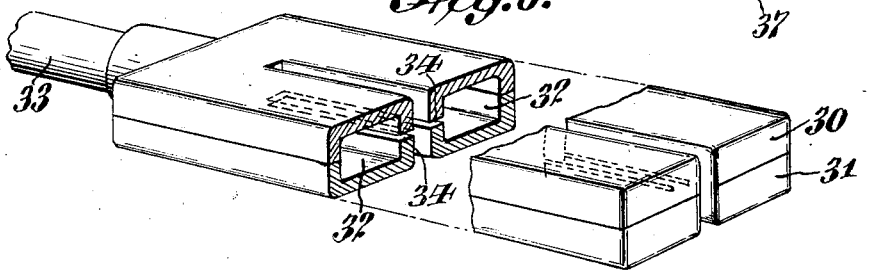
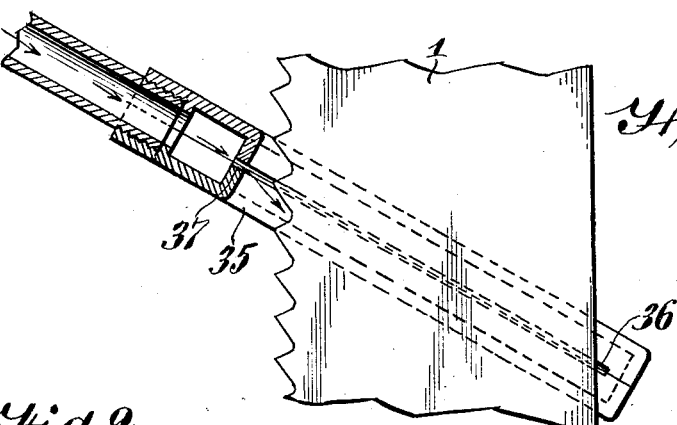
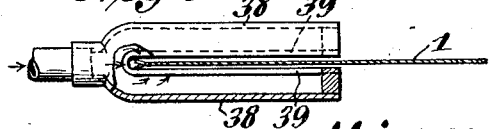

Patented May 31, 1932

1,861,412

UNITED STATES PATENT OFFICE

VINCENT OLIVER, OF PHILADELPHIA, PENNSYLVANIA, ASSIGNOR TO JOHN E. MUNRO, OF CARLISLE, PENNSYLVANIA

METHOD OF AND APPARATUS FOR CLEANING BAND SAWS

Application filed September 30, 1931. Serial No. 565,983.

In the method of and apparatus heretofore employed in the cleaning of band saws, it has been the custom, in so far as I am aware where compressed air is used, to direct the air from the rear towards the cutting edge of the band saw. I have found that better results are obtainable if the air is directed towards the cutting edge of the blade and also at the same time against the gullets of the teeth and the sides of the blade.

I have also found there is a tendency for the material removed from the band saw to adhere to the walls of the discharge conduit and I therefore provide means for heating such wall so that the material removed from the band saw will readily flow through it.

With the above in view my invention comprehends a novel method of and apparatus for cleaning band saws.

It further comprehends a novel method of and apparatus for cleaning band saws wherein the cleaning medium, such as, for example, air, is directed toward the faces of the cutting edges of the band saw and simultaneously therewith against the sides for a desired distance throughout its width.

It further comprehends a novel construction and advantage of heating means for heating a wall of the discharge conduit through which the material removed from the band saw passes.

Other novel features of construction and advantage will hereinafter more clearly appear in the detailed description and the appended claims.

For the purpose of illustrating the invention, I have shown in the accompanying drawings typical embodiments of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 1 is a side elevation of an apparatus for cleaning band saws embodying my invention and by means of which my novel method can be carried out.

Figure 2 is a section on line 2—2 of Figure 1.

Figure 3 is a section on line 3—3 of Figure 1.

Figure 4 is a section on line 4—4 of Figure 1.

Figure 5 is a sectional elevation of the air nozzle in detached position.

Figure 5a is a sectional elevation of another embodiment of nozzle, in conjunction with a band saw.

Figure 6 is a perspective view, partly broken away, of another embodiment of my invention.

Figure 7 is a side elevation, partly in section, showing the construction shown in Figure 6 in relation with a band saw.

Figure 8 is a sectional view of another form of nozzle which can be employed.

Figure 9 is a plan view, partly in section, of another form of nozzle embodying my invention, in conjunction with a band saw, the band saw being shown in section.

Figure 10 is a perspective view showing a portion of one of the nozzle members seen in Figure 9.

Figure 11 is a sectional view of another embodiment of my invention.

Figure 12 is a section on line 12—12 of Figure 1.

Similar numerals of reference indicate corresponding parts.

Referring to the drawings:—

1 designates a band saw of a meat cutting machine which is operated in any desired or conventional manner as will be understood by those skilled in this art, and I have, therefore, deemed it unnecessary to illustrate any detailed construction of the meat cutting machine.

2 designates a discharge conduit having an upper slot 3 and a lower slot 4 through which the band saw passes. The lower end of the conduit 2 is provided with a discharge opening 5 controlled by a gate 6. Above the conduit 2 are disposed a pair of scraping blades 7 which converge towards each other and are recessed to form a slot 8 which is enlarged at one end as at 9 to form a clearance for the teeth of the saw. In order to remove the material adhering to the saw, I provide a novel pressure means comprising a flexible hose 10 which is connected with a source of pressure supply, for example, an air compressor. The hose 10 is connected by a fitting 11 through the discharge conduit 2 and communicates with a pipe 12 which is in threaded engagement with the rear end of a novel nozzle 13, the construction of which will be best understood by reference to the sectional view seen in Figure 5. The nozzle 13 is provided with a downwardly extending slot 14, the walls of which are transversely split as at 15, which also opens through one end, as at 16, so that the slot through the inner side walls of the casing of the nozzle surround two sides and the front end of the saw 1. The casing of the nozzle 13 is provided with a chamber 17 which extends on both sides of the slots 15. The pipe 12 is preferably downwardly directed as shown in Figure 1 so that the air or other medium passing from the chamber 17 through the slots 15 and 16 will be directed from the front end of the cutting edge of the saw towards the teeth into the gullets between the teeth and also against the opposite side walls of the band saw.

The slot 4 is best shown in Figure 4, from which it will be seen that it consists of a narrow slot through which the body portion of the band saw 1 passes and at its front portion it is enlarged to provide a clearance for the teeth as shown at 18.

Beneath the nozzle 13 I provide a second pair of scraping blades 19 which are supported by the brackets 20 secured by means of fastening devices 21 to the inner wall of the conduit 2. Each scraping blade 19 is provided with a lower upwardly extending wall 22 and with an upwardly extending side wall 23. These scraping blades do not overhang the teeth but engage the smooth sides of the band saw.

In order to prevent the material removed from the band saw adhering to the wall of the discharge conduit 2, I provide an electric heater 24 secured by means of fastening devices 25 to the outer wall of the discharge conduit and the conductor 26 from this electric heater is connected in any desired manner with a source of electric supply. It will be understood that this electric heater may have any desired dimensions relatively to the wall of the discharge conduit.

In the embodiment seen in 5a, the construction of the nozzle is similar to that already described except that the nozzle 27 is shorter and its chamber 28 surrounds only the front portion of the band saw and the slot 29 through its inner side wall provides for discharge of air under pressure against the teeth and also against the opposite sides of the band saw in proximity to such teeth.

In Figure 6 the nozzle has been shown as made in the form of casing sections 30 and 31 secured together in any desired manner in order to form sealed chambers 32 which are closed at their outer ends and communicate with each other at their inner ends. In this construction the slots 34 are through the side walls.

In the embodiment seen in Figure 7, the nozzle is provided with a slot 35 through it to receive the saw and with a bifurcated end having the slots 36, and the rear wall of the slot 35 is provided with a slot 37 which is also shown in Figure 8.

In the embodiment seen in Figure 9, the nozzle is bifurcated to form cylindrical nozzles 38, each having a side slot 39, see also Figure 10, and these slots merge into each other at their rear ends so that the air will be directed against the teeth of the saw.

In Figure 11, the cross sectional view of the nozzle shows the bifurcated ends 41 as having an elliptical contour with the side slots 42 and the rear slot 43.

In all of the embodiments of my invention, as herein shown, I provide means for injecting the air in the form of a sheet from the front against the teeth and from the front downwardly into the gullets and also simultaneously therewith against opposite sides of the body portion of the saw so that any material adhering to the side walls of the saw, the gullets or the teeth, is effectively removed.

In accordance with this invention the band saw cleaning mechanism is adapted to be used on a machine for cutting meat containing bone and I preferably employ a set of scrapers constructed to remove the greater part of the waste material from the saw. Beneath this first set of scrapers a novel nozzle is employed which impinges a sheet of air under pressure from the front against the teeth and into the gullets of the teeth and against the opposite sides of the band saw which removed all material such as, meat, fiber, fat, bone splinters, and all other free material cut from the meat and adhering to the teeth, gullets and sides of the saw. Beneath the nozzle I employ a second set of scrapers which press against the sides of the saw. The material removed is deposited into a conduit which is constructed and operated to prevent the waste material from again coming into contact with the saw blade or any other parts of the machine, the material being collected in such a manner that it can be readily removed whenever desired.

It will now be apparent that I have devised a new and useful method of and apparatus for cleaning band saws which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

Having thus described my invention what I claim as new and desire to secure by Letters Patent, is:—

1. The method of cleaning band saws, which consists in injecting air in a sheet form from in front of the band saw towards its teeth, and simultaneously against opposite side walls of the saw.

2. The method of cleaning band saws, which consists in impinging a sheet of air from in front of the saw toward the cutting teeth of the saw and downwardly on opposite sides into the gullets of the teeth, and simultaneously against opposite side walls of the band saw.

3. The method of cleaning a band saw, which consists in subjecting it to the action of a plurality of pairs of scraping blades and between said blades to a sheet of air under pressure which impinges from the front into the teeth and also against the sides of the band saw.

4. The method of cleaning a band saw, which consists in subjecting it to the action of a plurality of pairs of scraping blades and between said blades to a sheet of air under pressure which impinges from the front into the teeth and also against the sides of the band saw, receiving the material in a discharge conduit, and subjecting a wall of the conduit to the action of heat to prevent the material removed from the band saw adhering to the wall of the conduit.

5. Band saw cleaning mechanism, comprising a slotted nozzle having the wall of the slot on opposite sides provided with a narrow opening which merges into each other at the rear end to cause fluid under pressure to impinge from the front into the teeth of the saw, into the gullets of the teeth, and also against opposite sides of the band saw, said nozzle being adapted to be connected to a source of fluid under pressure.

6. Band saw cleaning mechanism, comprising a conduit, a slotted nozzle adapted to be connected with a source of fluid under pressure, the slot in said nozzle being adapted to receive a band saw, the walls of said slot on opposite sides and at its rear end being provided with a narrow opening to cause the fluid under pressure to be directed into the teeth of the saw, the gullets of the teeth, and against opposite sides of the saw.

7. Band saw cleaning mechanism, comprising in combination with the band saw, means to direct fluid under pressure from in front of the saw in a downwardly inclined direction into the teeth of the saw, and also into the gullets of the teeth at each side of the saw.

8. Band saw cleaning mechanism, comprising a conduit having slots, a band saw to pass through said slots, a mechanical scraper above said conduit, a mechanical scraper for said band saw within the conduit, and a nozzle through which the band saw passes and adapted to be connected with a source of fluid under pressure, said nozzle having openings to direct air from the front towards the teeth of the saw, and also against the side walls of the saw.

9. Band saw cleaning mechanism, comprising a pair of scraping blades tilted towards the saw, each having front and bottom edges having lateral edges with both lateral edges inclining downwardly from the saw, and means to secure said scraping blades in position to cause their operative edges to converge towards and engage the band saw.

10. Band saw cleaning mechanism for meat cutting machines, comprising a set of scrapers constructed to remove the greater part of the waste material from the saw, a nozzle located beneath said scrapers and constructed to impinge a sheet of air under pressure against the front of the saw and the sides of the saw, and a second set of scrapers beneath said nozzle and pressing against the sides of the band saw.

In testimony whereof I affix my signature.

VINCENT OLIVER.